(12) United States Patent
Ducornait et al.

(10) Patent No.: US 9,303,678 B2
(45) Date of Patent: Apr. 5, 2016

(54) NUT

(71) Applicant: NEWFREY LLC, Newark, DE (US)

(72) Inventors: Pierre-Yves Ducornait, Giessen (DE); Michael-Udo Schmidt, Giessen (DE); Frank Rosemann, Giessen (DE); Nicolas Patricot, Chateaufort (FR)

(73) Assignee: NEWFREY LLC, New Britain, CT (US)

( * ) Notice: Subject to any disclaimer, the term of this patent is extended or adjusted under 35 U.S.C. 154(b) by 500 days.

(21) Appl. No.: 13/734,290

(22) Filed: Jan. 4, 2013

(65) Prior Publication Data

US 2013/0117996 A1 May 16, 2013

Related U.S. Application Data

(63) Continuation of application No. PCT/EP2011/059700, filed on Jun. 10, 2011.

(30) Foreign Application Priority Data

Jul. 6, 2010 (DE) .......................... 10 2010 027 204

(51) Int. Cl.
*F16B 37/00* (2006.01)
*F16B 39/284* (2006.01)
*F16B 37/08* (2006.01)

(52) U.S. Cl.
CPC ........... *F16B 39/284* (2013.01); *F16B 37/0842* (2013.01); *F16B 37/005* (2013.01); *Y10T 29/49948* (2015.01)

(58) Field of Classification Search
CPC ... F16B 39/284; F16B 37/0842; F16B 37/005
USPC .......................................... 411/427, 437, 512
See application file for complete search history.

(56) References Cited

U.S. PATENT DOCUMENTS

| | | | |
|---|---|---|---|
| 4,299,520 A | 11/1981 | Iwata | |
| 4,435,111 A * | 3/1984 | Mizusawa | 411/437 |
| 4,521,148 A * | 6/1985 | Tanaka | 411/182 |
| 4,728,236 A * | 3/1988 | Kraus | 411/437 |
| 4,828,444 A * | 5/1989 | Oshida | F16B 37/043 411/437 |
| 4,999,019 A * | 3/1991 | Kraus | 411/512 |
| 5,098,242 A | 3/1992 | Schaty | |
| 5,302,070 A * | 4/1994 | Kameyama et al. | 411/437 |
| 5,423,647 A * | 6/1995 | Suzuki | 411/433 |
| 5,816,762 A * | 10/1998 | Miura et al. | 411/433 |
| 5,906,464 A * | 5/1999 | Wedenig | 411/433 |
| 6,155,762 A * | 12/2000 | Courtin | 411/512 |
| 7,114,901 B2 * | 10/2006 | Maruyama et al. | 411/353 |
| 7,891,151 B2 * | 2/2011 | Sano | 52/506.05 |

* cited by examiner

*Primary Examiner* — Gary Estremsky
(74) *Attorney, Agent, or Firm* — Michael P. Leary

(57) ABSTRACT

A nut for fastening a first workpiece defining a through recess to a second workpiece including a bolt projecting in an axial direction through the recess, and the nut comprises an axially extending shank and flange at a first end of the shank, and the nut defines a bore extending axially through the flange and into the shank and further defines an opening to the bore proximate to the first end of the shank, and the nut further includes an elastic holding section radially outward of the opening, and the nut partially defines a depression radially outward of the holding section, so that the holding section can flex radially outward into the depression when the nut is jammed onto the bolt.

11 Claims, 2 Drawing Sheets

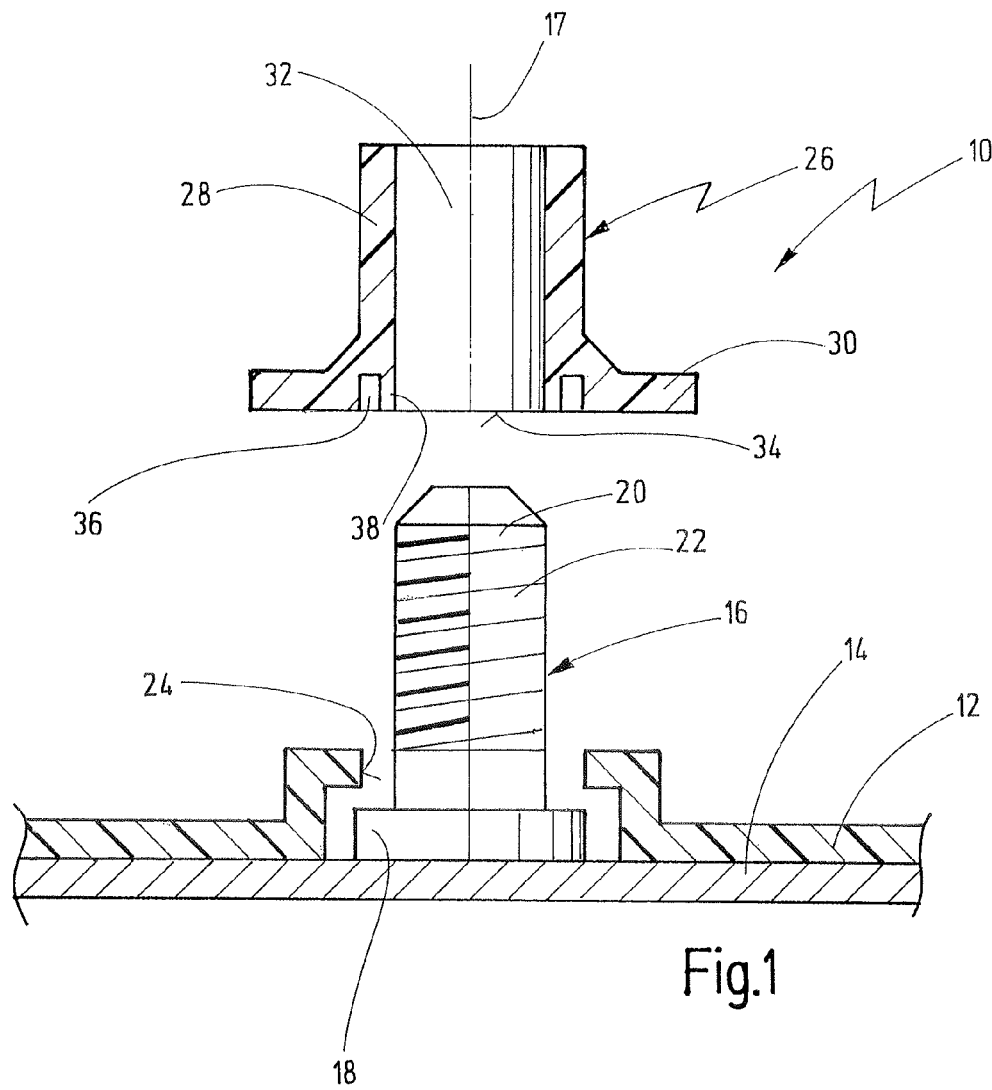
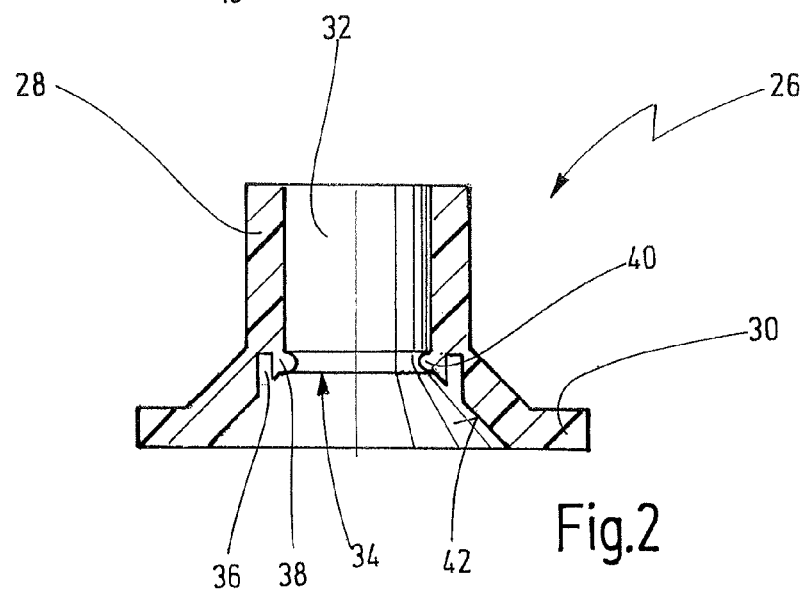

NUT

CROSS-REFERENCE TO RELATED APPLICATION

This application is a continuation of PCT/EP2011/059700, filed Jun. 10, 2011 which claims priority from German Patent Application No. DE 102010027204.3, filed on Jul. 6, 2010, the disclosure of which is incorporated herein by reference.

BACKGROUND OF THE INVENTION

The present invention relates to a nut for a fastening arrangement for fixing an item to a structural component, the nut having an axially aligned socket for a bolt, which can be joined to the structural component, and the socket having an opening, via which the bolt can be introduced into the socket.

The present invention further relates to a fastening arrangement for fixing an item to a structural component, comprising a bolt which is joined to the structural component in a longitudinal (axial) direction, and a nut which is fixed to the bolt, the nut having a flange section, and the item being fixed between the flange section and the structural component and/or between the flange section and a flange of the bolt.

Finally the present invention relates to a method of fastening an item to a structural component, particularly for producing a fastening arrangement, comprising steps in which a nut is slipped on to an upper side of a bolt joined to a structural component and the nut is then driven on to the bolt by means of a blow in a longitudinal direction, the item being fixed between a flange section of the nut and the structural component and/or a flange of the bolt.

Fastening arrangements of the aforementioned type are used in motor vehicle construction, for example. By means of such a fastening arrangement or a plurality of such fastening arrangements it is possible, for example, to attach flat panelling elements to the underbody of a vehicle.

In doing this a first step is to join a bolt perpendicularly to a surface of the structural component (such as an underbody sheet metal panel) in order to produce a fastening arrangement. This can be done, for example, by means of so-called stud welding, but it can also be accomplished by adhesive bonding methods or thermoplastic welding methods. In the case of stud welding the bolt and the structural component are generally made of a metal material. In the case of adhesive bonding the bolt and the structural component may also be of any other materials. In the case of thermoplastic welding the bolt and the structural component are generally made of plastic.

In a known method of producing a fastening arrangement of the aforementioned type the bolt joined to the structural component is a threaded bolt having a metric thread. The nut is correspondingly a threaded nut having a corresponding metric internal thread. In order to fasten the item it is placed on the structural component, the bolt protruding through a recess in the item. The nut is then screwed on to the threaded bolt.

Alternatively, another known method is to drive bolt nuts on to such bolts. If the bolt is made of a metal material, the nut in this case may be made of a plastic material, for example. In this case the nut is first slipped onto the upper side of the bolt and is then pressed by means of a blow (with a hammer, for example) axially on to the bolt. Here the nut is formed with a coarse screw thread on its inner circumference, for example.

Although driven assembly makes the actual assembly operation easier, since it obviates the need for a rotating movement of the nut, the quality of the fastening arrangement produced in this way largely depends on whether the nut has previously been correctly slipped on to the upper side of the bolt.

If the driven nut has a coarse screw thread on its inner circumference, fluctuations can furthermore occur in the holding forces attainable.

In this context, an object of the invention is to specify an improved nut, an improved fastening arrangement and an improved method of fastening.

In the case of the nut specified in the introductory part, this object is achieved in that in the area around the opening the nut has at least one depression, which is designed so that a radially elastic holding section is formed between the opening and the depression.

In the case of the fastening arrangement specified in the introductory part the object is achieved in that the nut is a nut according to the invention.

In the case of the method specified in the introductory part this object is achieved in that, in the area of the opening through which the bolt enters the nut, the nut has an elastic holding section, which serves to hold the nut in the time between slipping the nut on to the bolt and driving the nut on to the bolt.

Designing such a nut with an elastic holding section in the edge area of the opening means that prior to final assembly the nut can be securely pre-assembled with relatively high pre-assembly holding forces. Such a nut is generally advantageous if it has a metric internal thread and is screwed on to a threaded bolt in a final assembly step.

This type of pre-assembly is particularly advantageous, however, if the nut is then finally assembled by means of an axial blow. The elastic holding device in this case ensures a precise positioning of the nut in relation to the bolt. Furthermore, the nut cannot accidentally fall off between pre-assembly and final assembly.

The elastic holding device is furthermore also capable of yielding elastically as the nut is driven home, so that the holding device can also help to increase the holding forces after performing the final assembly step. This applies in particular if the bolt is embodied as a threaded bolt (with metric thread or coarse screw thread).

The object is therefore achieved in full.

According to a preferred embodiment the depression is embodied as an annular depression around the opening.

Here the radially elastic holding section is embodied as a thin shank stub, which can yield elastically, radially outwards into the depression and after slipping the nut on can exert radial holding forces acting inwards on the bolt.

However, the depression can also be designed so that the radially elastic holding section has one or more radially elastic retaining tongues distributed in a circumferential direction. In this case the depression is preferably connected on specific sections of the circumference to the opening or a section of the socket.

It is furthermore advantageous overall if the holding section comprises a projection (or lug) projecting radially inwards.

This reduces the inside diameter of the holding section in relation to the inside diameter of the socket. In other words the holding section is radially expanded by the projection bearing against the bolt. The projection here preferably makes the inside diameter of the holding section smaller than the outside diameter of the bolt, particularly a section of the bolt on which the nut is pre-assembled.

The projection on the inner circumference of the holding section may be a single annular ridge. However, a plurality of individual projections distributed over the circumference may also be provided on the inner circumference of the holding section.

It is particularly preferred if the projection is a continuous annular ridge running over the circumference of the holding section.

According to a further embodiment the nut has an introduction taper, which leads into the opening.

This measure makes it easier to slip the nut on to the bolt for the purpose of pre-assembly. The introduction taper here has a large diameter in the area of the underside of the nut, which tapers down to the diameter of the opening of the socket. In this case the larger diameter may be at least twice the diameter of the opening.

It is especially preferred here if the depression is located in the area of the introduction taper.

The holding section here preferably also has a conically tapering shape at its end pointing away from the socket.

This makes it even easier to introduce the bolt into the nut for the purpose of pre-assembly.

It is furthermore advantageous overall if the socket is of circular cross section.

This allows the holding force achieved by the final assembly to be set to a predetermined value with no fluctuations. It is especially preferred here if the socket on its circumference (and/or the nut on its inner circumference) is of substantially smooth design, that is to say without internal thread.

It is furthermore advantageous overall if the socket extends axially right through the nut and if an inspection section extending in a transverse direction thereto, which is destroyed when the bolt is introduced, is formed in the socket.

It can happen, particularly in the so-called driven assembly, that the nut is not driven far enough onto the bolt in an axial direction. In this case the inspection section would not be destroyed. Since the socket passes right though in an axial direction, the inspection section can be inspected after performing the final assembly step, in order to establish whether the nut has been driven far enough on to the bolt.

The inspection section may take the form of a continuous film over the cross-sectional area of the socket, for example, but it may also be formed by a narrow cross web or the like.

It is especially preferred here if the diameter of the socket, in a section on the side of the inspection section remote from the opening, is larger than the diameter of the socket in a section on the side of the inspection section facing the opening.

This serves to improve the fracturing properties of the inspection section.

In the case of the fastening arrangement according to the invention it is particularly advantageous if the bolt is a threaded bolt having a longitudinal groove formed in the threaded area.

Such a threaded bolt may be embodied as a metric bolt having a so-called paint groove, for example.

For the purpose of anticorrosion protection the bolts, especially in motor vehicle engineering, are joined to the vehicle body in the untreated state (particularly in stud welding). The bolt is then painted together with the structural component to which it is fastened.

When screwing a nut on to such a threaded bolt, such a paint groove can ensure that the paint applied does not interfere with the thread engagement.

When driving a nut on to such a bolt it is particularly advantageous if the socket for the bolt is of circular cross section. In this case uniformly high holding forces result irrespective of the relative rotational position between the bolt and the nut.

It goes without saying that the aforementioned features and those yet to be explained below can be used not only in the particular combination specified but also in other combinations or individually without departing from the scope of the present invention.

BRIEF DESCRIPTION OF THE SEVERAL VIEWS OF THE DRAWINGS

Exemplary embodiments of the invention are represented in the drawing and will be explained in more detail in the following description. In the drawings:

FIG. 1 shows a schematic representation of a first embodiment of a fastening arrangement according to the invention;

FIG. 2 shows a schematic representation of an alternative embodiment of a nut according to the invention;

DETAILED DESCRIPTION OF THE PREFERRED EMBODIMENTS

Figure 3:
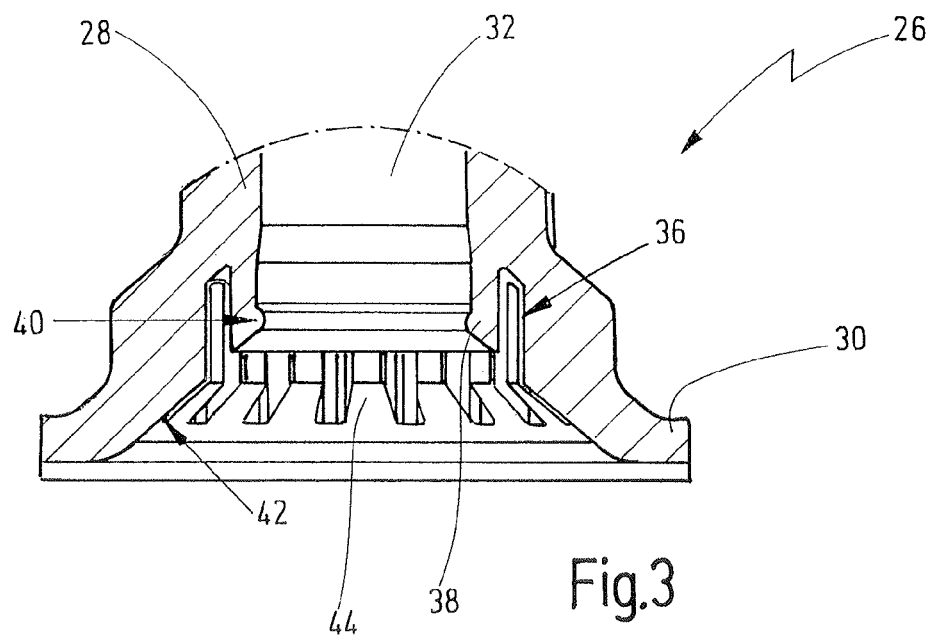
FIG. 3 shows a partially sectional view of a further embodiment of a nut according to the invention.

In FIG. 1 a fastening arrangement is denoted generally by 10. The fastening arrangement 10 serves for fixing a first work piece, for example an item 12, such as a flat item, in particular an underbody panel, to a second work piece, for example structural component 14, such as a vehicle sheet metal plate.

The fastening arrangement comprises a bolt 16, which is joined perpendicularly in a longitudinal (or axial) direction 17 to a surface of the structural component 14, for example by so-called stud-welding.

The bolt 16 comprises a flange 18, the underside of which is joined to the upper side of the structural component 14. The bolt 16 further comprises a shank 20, which extends from the flange 18 in the longitudinal direction 17 and the diameter of which is smaller than that of the flange 18.

A threaded section 22 may be formed on the shank 20.

The item 12 has a recess 24 and is arranged on the upper side of the structural component 14 in such a way that at least a part of the shank 20 of the bolt 16 extends through the recess 24 and beyond the upper side of the item 12.

The fastening arrangement 10 further comprises a nut 26. The nut 26 is integrally made from plastic and comprises a shank section 28 and a flange section 30, which has a larger diameter than the shank section 28.

The nut 26 furthermore has a socket 32 for the bolt 16, the socket being embodied as an axial bore of circular cross section passing all the way through the nut 26 in a longitudinal direction 17.

The shank 20 of the bolt 16 and the socket 32 are preferably of circular cross section, but may also be polygonal.

The socket 32 has an opening 34, via which the bolt 16 is introduced into the socket 32.

Also provided around the opening 34 is an annular depression 36, which extends from the underside of the flange section 30 and is formed in the manner of a blind depression.

The depression 36 is preferably concentric with the opening 34. A holding section 38 in the form of a short shank stub, which is capable of yielding elastically in a radial direction into the depression 36, is thereby formed between the opening 34 and the depression 36.

Here, the inside diameter of the holding section 38 may be somewhat smaller than the inside diameter of the socket 32.

When the nut 26 is fitted to the bolt 16, the holding section 38 can exert a radial contact pressure on the bolt 16.

The inner circumference of the socket 32 is preferably smooth, and the nut 26 is preferably designed for driven assembly.

In FIG. 1 the nut 26 is shown separated from the bolt. For driven assembly the nut 26 is first slipped onto an upper side of the bolt 16. The holding section 38 here serves for fixing such a pre-assembly position. A blow is then applied to the upper side of the nut 26, so that this is driven in a longitudinal direction 17 on to the bolt 16. The outside diameter of the flange section 30 is greater than the diameter of the recess 24, so that the item 12 is fixed between the flange section 30 and the upper side of the structural component 14. FIG. 1 shows that the item 12 is separated at a distance from the flange 18 of the bolt 16. A part of the item 12 surrounding the recess 24 may also rest on the upper side of the flange 18, however, so that the item 12 is fixed between the underside of the flange section 30 and the upper side of the flange 18.

Figure 4:
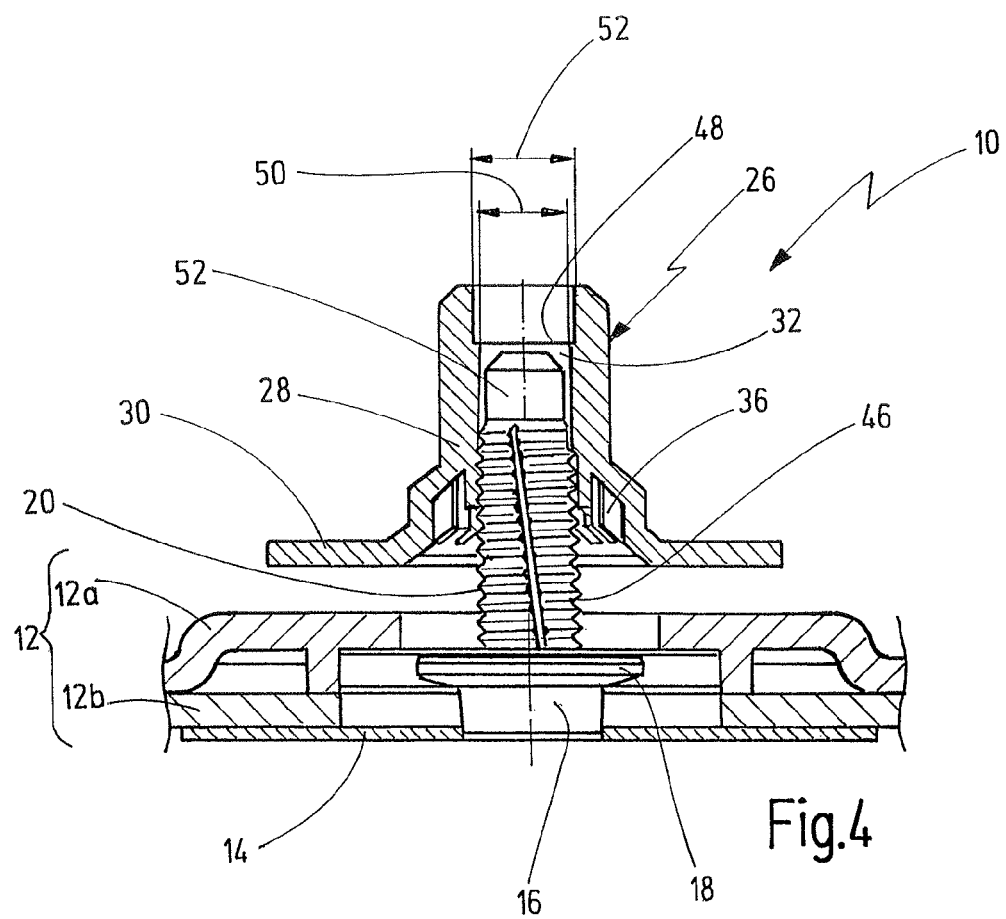
FIG. 4 shows a further alternative embodiment of a fastening arrangement according to the invention.

The following FIGS. 2 to 4 show further embodiments of fastening arrangements and nuts according to the invention. These correspond generally in their construction and working principle to the fastening arrangement 10 and the nut 26 in FIG. 1. The same elements are therefore provided with the same reference numerals. It is essentially the differences that are explained below.

FIG. 2 first shows that the holding section 38 has an inner projection (or lug) 40 in the form of a circumferential annular ridge on its inner circumference. The inside diameter of the holding section 38 with the projection 40 formed thereon is then smaller than the diameter of the socket 32. This ensures, when introducing the bolt 16, that the holding section 38 is deflected elastically in a radial outward direction. The radial thickness of the projection 40 is here preferably approximately equal to the radial thickness of the depression 36. As a result the holding section 38 is able to yield elastically in a radial outward direction into the annular depression 36. After slipping on to the bolt 16 the holding section 38 can exert a radial inward contact pressure on the bolt 16.

FIG. 2 further shows that the nut 26 has an introduction taper 42 between the flange 30 and the opening 34, which makes it easier to slip the nut 26 on to the upper side of the bolt 16. In this embodiment, the depression 36 is formed at the narrower end of the introduction taper 42.

FIG. 3 shows a further alternative embodiment of a nut 26, which in terms of its construction and working principle corresponds generally to the nut 26 in FIG. 2. It can also be seen from the nut 26 in FIG. 3 that the nut has reinforcing ribs 44 in the area of the introduction taper 42.

FIG. 4 shows a further embodiment of a fastening arrangement 10.

It can be seen from this that the shank 20 of the bolt 16 has a threaded section with a paint groove 46 running approximately axially and helically.

The nut 26 in FIG. 4 furthermore has an inspection section 48 in the form of a thin film extending transversely to the socket 32. The axial arrangement of the inspection section 48 here is selected so that this is broken or pierced when the nut 26 is correctly fitted on the bolt 16. FIG. 4 shows that the nut 26 has not been driven far enough on to the bolt 16, so that the underside of the flange section 30 is separated by a distance from the upper side of the item 12.

In order to improve the fracture properties of the inspection section 48, the diameter 52 of the socket 32 on the side of the inspection section 48 remote from the opening 34 is greater than the diameter 50 of the socket 32 in a section on the side of the inspection section facing the opening 34.

It can further be seen from FIG. 4 that the item 12 may also be of multi-piece design. Here the item 12 comprises a lower layer 12b and an upper layer 12a.

Although exemplary embodiments of the present invention have been shown and described, it will be appreciated by those skilled in the art that changes may be made to these embodiments without departing from the principles and spirit of the invention, the scope of which is defined in the appended claims and their equivalents.

What is claimed is:

1. A nut for fastening a first workpiece defining a through recess to a second workpiece including a bolt projecting in an axial direction through the recess, and the nut comprises: an axially extending shank and a flange at a first end of the shank, and the nut defines a bore extending axially through the flange and into the shank and further defines an opening to the bore proximate to the first end of the shank, via the opening the nut being insertable over the bolt, and the nut further includes an elastic holding section radially outward of the opening, and the nut partially defines a blind depression radially outward of the holding section and the depression is open toward the flange; and wherein the bore extends axially through the nut and the nut further includes a frangible inspection section extending radially across the bore, and the inspection section is breakable by a bolt inserted into the nut to a predetermined axial distance.

2. A nut according to claim 1, wherein the depression is an annular depression around the opening.

3. A nut according to claim 2, wherein the holding section includes a projection extending radially inward into the opening of the bore.

4. A nut according to claim 1, wherein the nut further defines an introduction taper, which narrows from the flange to the opening.

5. A nut according to claim 4, wherein the depression is located radially outward of the opening.

6. A nut according to claim 1, wherein the bore is of circular cross section.

7. A nut according to claim 1, wherein the bore defines a first diameter, at an axial location on a first side of the inspection section facing away from the opening, and a second diameter, at an axial location on a second side of the inspection section facing towards the opening, and the first diameter is larger than the second diameter.

8. A nut according to claim 1, wherein the nut is integrally formed from plastic.

9. A nut for fastening a first workpiece defining a through recess to a second workpiece including a bolt projecting in an axial direction through the recess, and the nut comprises:
an axially extending shank;
a flange located at a first end of the shank;
an axial through bore defined by the shank and flange, and the bore including an opening proximate to the first end of the shank and via which opening the nut is insertable over the bolt;
an axially extending blind groove partially defined by the nut, located radially outward of the opening, and open toward the flange;
an elastic holding element located between the opening and the blind groove, and radially displaceable into the blind groove; and
a frangible inspection element extending radially across the bore, and the inspection element is breakable by a bolt inserted into the nut to a predetermined axial distance.

10. A nut according to claim 9, wherein the bore defines a first diameter, at a first axial location on a first side of the inspection element facing away from the opening, and a second diameter, at a second axial location on a second side of the inspection element facing towards the opening, and the first diameter is larger than the second diameter.

11. A nut according to claim 9, wherein the nut further defines an introduction taper, which narrows from the flange to the opening.

\* \* \* \* \*